United States Patent
Lösch et al.

(10) Patent No.: US 7,968,658 B2
(45) Date of Patent: Jun. 28, 2011

(54) METHOD FOR PRODUCING POLYMERS BY DISPERSION POLYMERIZATION

(75) Inventors: Dennis Lösch, Altrip (DE); Christian Hubert Weidl, Mannheim (DE); Volker Seidl, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1099 days.

(21) Appl. No.: 11/660,284

(22) PCT Filed: Aug. 9, 2005

(86) PCT No.: PCT/EP2005/008610
§ 371 (c)(1),
(2), (4) Date: Feb. 15, 2007

(87) PCT Pub. No.: WO2006/024369
PCT Pub. Date: Mar. 9, 2006

(65) Prior Publication Data
US 2007/0244280 A1 Oct. 18, 2007

(30) Foreign Application Priority Data
Sep. 2, 2004 (DE) .......................... 10 2004 042 948

(51) Int. Cl.
*C08F 2/01* (2006.01)
*C08F 20/06* (2006.01)

(52) U.S. Cl. ........ 526/88; 526/310; 526/317.1; 526/318

(58) Field of Classification Search .................. 526/310, 526/317.1, 318, 88
See application file for complete search history.

(56) References Cited

U.S. PATENT DOCUMENTS

| | | | |
|---|---|---|---|
| 2,956,046 A | 10/1960 | Glavis et al. | |
| 3,644,305 A * | 2/1972 | Frisque et al. | 526/229 |
| 6,174,946 B1 | 1/2001 | Rubenacker et al. | |
| 2002/0193546 A1 * | 12/2002 | Freeman et al. | 526/310 |

FOREIGN PATENT DOCUMENTS

| | | |
|---|---|---|
| DE | 195 06 287 | 8/1996 |
| EP | 0 191 877 | 8/1986 |
| EP | 0 398 151 | 11/1990 |
| FR | 2 809 107 | 11/2001 |
| GB | 0 777 306 | 6/1957 |
| WO | WO-96/40427 | 12/1996 |
| WO | WO-99/14246 | 3/1999 |

OTHER PUBLICATIONS

International Search Report in PCT/EP2005/008610 dated Nov. 3, 2005.

* cited by examiner

*Primary Examiner* — Ling-Siu Choi
(74) *Attorney, Agent, or Firm* — Marshall, Gerstein & Borun LLP

(57) ABSTRACT

Process for producing polymers by spray polymerization wherein the monomer solution is dispersed in a hydrophobic liquid, the use of the polymers for thickening liquids and also an apparatus for producing polymers by spray polymerization.

11 Claims, No Drawings

METHOD FOR PRODUCING POLYMERS BY DISPERSION POLYMERIZATION

CROSS-REFERENCE TO RELATED APPLICATIONS

This is the U.S. national phase application of International Application No. PCT/EP2005/008610, filed Aug. 9, 2005, which claims the benefit of German patent application No. 102004042948.0, filed Sep. 2, 2004.

The present invention relates to a process for producing polymers by spray polymerization, to their use for thickening liquids and to a device for producing polymers by spray polymerization.

Further embodiments of the present invention are discernible from the claims, the description and the examples. It will be appreciated that the hereinbefore identified and the hereinafter still to be more particularly described features of the subject matter of the present invention are utilizable not only in the particular combination indicated but also in other combinations without leaving the realm of the present invention.

WO-A-99/14246 describes the production of polymers by emulsion polymerization in the presence of ionizable stabilizers. The polymer dispersions are spray dried. The polymer powders thus obtained can be used as thickeners or flocculants.

EP-A-0 398 151 describes the production of polymeric thickeners by spray drying aqueous polymer solutions or dispersions.

DE-A-195 06 287 describes the production of thickeners for print pastes. The thickeners are prepared by emulsion polymerization, azeotropically dewatered and filtered.

FR-A-2 809 107 describes the azeotropic dewatering of emulsion polymers.

GB-A-0 777 306 describes the production of polymers by spray polymerization. The reaction is catalyzed by amides, such as acrylamide, acetamide and partially hydrolyzed polyacrylonitrile. The polymers can also be used as thickeners for synthetic resin dispersions.

U.S. Pat. No. 3,644,305 discloses a spray polymerization process whereby low molecular weight polymers can be produced. The polymerization is carried out at elevated pressure.

According to WO-A-96/40427, spray polymerization is carried out by spraying monomer solutions into a heated atmosphere which is essentially static. The monomers in the sprayed droplets are polymerized and the droplets are concurrently dried. At reduced pressure, the water content in the polymer spheres produced is distinctly reduced, but the polymeric particles have a rough surface. At elevated pressure, smooth polymeric spheres are obtained. The application teaches that the particle size can be adjusted via the nozzle orifice.

The present invention has for its object to provide an improved process for producing polymers.

The present invention further has for its object to provide polymers for thickening liquids.

We have found that this object is achieved by a process for spray polymerization of a monomer dispersion comprising
a) at least one water soluble ethylenically unsaturated monomer,
b) at least one initiator and
c) water,
where the monomer composition further comprises at least one hydrophobic, inert liquid, d), the aqueous phase being dispersed in the liquid d).

As hydrophobic, inert liquid d) there can be used virtually all water-immiscible liquids which do not take part in the polymerization, i.e., do not comprise any polymerizable groups. By water-immiscible is meant that the solubility of the hydrophobic liquid d) in water is less than 5 g/100 g, preferably less than 1 g/100 g and more preferably less than 0.5 g/100 g. It is preferable to use aliphatic and aromatic hydrocarbons or mixtures of aliphatic and aromatic hydrocarbons. Examples of suitable aliphatic hydrocarbons are pentane, hexane, heptane, octane, nonane, decane, cyclohexane, decalin, methylcyclohexane, isooctane and ethylcyclohexane. Aromatic hydrocarbons useful as a hydrophobic liquid are for example benzene, toluene, and xylene. In addition, it is also possible of course to use halogenated hydrocarbons, such as tetrachloroethane, hexachloroethane, trichloroethane and chlorobenzene. It is preferable to use cyclohexane or hydrocarbons having a boiling range from 60 to 170° C. The fraction of hydrophobic liquid is in the range from 10% to 80% by weight, preferably in the range from 15% to 75% by weight and more preferably in the range from 20% to 70% by weight.

The reaction can be carried out in the presence of an inert carrier gas, in which case inert is to be understood as meaning that the carrier gas cannot react with the constituents of the monomer solution. The inert gas is preferably nitrogen. The oxygen content of the inert carrier gas is advantageously below 1% by volume, preferably below 0.5% by volume and more preferably below 0.1% by volume.

The inert carrier gas can be led through the reaction space cocurrently with or countercurrently to the free-falling droplets of the monomer solution, preferably cocurrently.

The gas velocity is preferably such that flow in the reactor is laminar in that for example there are no convection eddies opposite to the general direction of flow, and is for example in the range from 0.02 to 1.5 m/s and preferably in the range from 0.05 to 0.4 m/s.

The reaction temperature is typically between 70 to 250° C., preferably 80 to 190° C. and more preferably 90 to 140° C.

The concentration of monomer a) in the monomer dispersion is typically in the range from 2% to 50% by weight, preferably in the range from 5% to 40% by weight and more preferably in the range from 10% to 30% by weight.

The solubility of monomer a) in water is typically not less than 1 g/100 g of water, preferably not less than 5 g/100 g water, more preferably not less than 25 g/100 g of water and most preferably not less than 50 g/100 g of water.

Ethylenically unsaturated monomers a) are for example ethylenically unsaturated $C_3$-$C_6$-carboxylic acids. These compounds are for example acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid and also the alkali metal or ammonium salts of these acids.

Further monomers a) are acrylamidopropanesulfonic acid, vinylphosphonic acid and/or alkali metal or ammonium salts of vinylsulfonic acid. Acids are used either in unneutralized form or in partially or 100% neutralized form.

Useful monomers a) further include monoethylenically unsaturated sulfonic or phosphonic acids, examples being allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid and 2-acrylamido-2-methylpropanesulfonic acid.

Further monomers a) are for example acrylamide, methacrylamide, crotonamide, acrylonitrile, methacrylonitrile, dimethylaminoethyl methacrylate, dimethylaminoethyl acrylate, dimethylaminopropyl acrylate, diethylaminopropyl acrylate, dimethylamino-butyl acrylate, dimethylaminoethyl methacrylate, diethylaminoethyl methacrylate, dimethylaminoneopentyl acrylate and dimethylaminoneopentyl methacrylate and also their quarternization products, for example with methyl chloride, hydroxyethyl acrylate, hydroxyethyl methacrylate, hydroxypropyl acrylate and hydroxypropyl methacrylate.

Further monomers a) are monomers which are obtainable by reaction of nitrogenous heterocycles and/or carboxamides, such as vinylimidazole, vinylpyrazole and also vinylpyrrolidone, vinylcaprolactam and vinylformamide, with acetylene and which can also be quaternized, for example with methyl chloride, and monomers obtainable by reaction of nitrogenous compounds, such as diallyldimethylammonium chloride, with allyl alcohol or allyl chloride.

It is further possible to use vinyl and allyl esters and also vinyl and allyl ethers, such as vinyl acetate, allyl acetate, methyl vinyl ether and methyl allyl ether as monomers a).

The monomers a) can be used alone or mixed with each or one another, for example mixtures comprising two or more monomers a). Preference is given to using mixtures comprising two different monomers a).

Preferred monomers a) are acrylic acid, methacrylic acid and also the alkali metal or ammonium salts of these acids, acrylamide, methacrylamide, acrylonitrile, methacrylonitrile, itaconic acid, vinylformamide, vinylpyrrolidone, vinylimidazole, quaternized vinylimidazole, vinyl acetate, sodium vinylsulfonate, vinylphosphonic acid, hydroxyethyl acrylate, hydroxyethyl methacrylate, 2-acrylamido-2-methylpropanesulfonic acid, diallyldimethylammonium chloride and also mixtures thereof.

The monomers a) are preferably stabilized with a commercially available polymerization inhibitor, more preferably with a polymerization inhibitor which only acts together with oxygen, an example being hydroquinone monomethyl ether.

Commercially available polymerization inhibitors are polymerization inhibitors which are used as storage stabilizers in the respective monomers for product safety reasons. Examples of such storage stabilizers are hydroquinone, hydroquinone monomethyl ether, 2,5-di-tert-butylhydroquinone and 2,6-di-tert-butyl-4-methylphenol.

Preferred polymerization inhibitors require dissolved oxygen for optimum performance. Therefore, the polymerization inhibitors can be freed of dissolved oxygen prior to polymerization by inertization, i.e., flowing an inert gas, preferably nitrogen, through them. The oxygen content of the monomer solution prior to polymerization is preferably lowered to less than 1 weight ppm and more preferably to less than 0.5 weight ppm.

The monomers a) are polymerized with each or one another in the presence of initiators b).

The initiators b) are used in customary amounts, for example in amounts from 0.001% to 5% by weight and preferably from 0.01% to 1% by weight, based on the monomers to be polymerized.

Useful initiators b) include all compounds which disintegrate into free radicals under the polymerization conditions, examples being peroxides, hydroperoxides, hydrogen peroxide, persulfates, azo compounds and redox initiators. Preference is given to the use of water-soluble initiators. In some cases it is advantageous to use mixtures of various initiators, examples being mixtures of hydrogen peroxide and sodium or potassium peroxodisulfate. Mixtures of hydrogen peroxide and sodium peroxodisulfate can be used in any proportion.

Useful organic peroxides are for example acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl)peroxydicarbonate, dicyclohexyl peroxydicarbonate, di(4-tert-butylcyclohexyl)peroxydicarbonate, dimyristil peroxydicarbonate, diacetyl peroxydicarbonate, allyl peresters, cumyl peroxyneodecanoate, tert-butyl per-3,5,5-trimethylhexanoate, acetylcyclohexylsulfonyl peroxide, dilauryl peroxide, dibenzoyl peroxide and tert-amyl perneodecanoate.

Preferred initiators b) are azo compounds, examples being 2,2'-azobisisobutyronitrile, 2,2'-azobis(2,4-dimethylvaleronitrile) and 2,2'-azobis(4-methoxy-2,4-dimethyl-valeronitrile), especially water soluble azo initiators, examples being 2,2'-azobis{2-[1-(2-hydroxyethyl)-2-imidazolin-2-yl] propane}dihydrochloride, 2,2'-azobis-(2-amidino-propane) dihydrochloride, 2,2'-azobis[2-(2-imidazolin-2-yl)propane] dihydrochloride and 2,2'-azobis[2-(5-methyl-2-imidazolin-2-yl)propane]dihydrochloride. Very particular preference is given to 2,2'-azobis[2-(2-imidazolin-2-yl)propane]dihydrochloride and 2,2'-azobis[2-(5-methyl-2-imidazolin-2-yl)propane]dihydrochloride.

Redox initiators are also further preferred initiators b). In redox initiators, the oxidizing component is at least one of the peroxo compounds indicated above and the reducing component is for example ascorbic acid, glucose, sorbose, ammonium bisulfite, ammonium sulfite, ammonium thiosulfate, ammonium hyposulfite, ammonium pyrosulfite, ammonium sulfide, alkali metal bisulfite, alkali metal sulfite, alkali metal thiosulfate, alkali metal hyposulfite, alkali metal pyrosulfite, alkali metal sulfide or sodium hydroxymethylsulfoxylate. The reducing component in the redox catalyst is preferably ascorbic acid or sodium pyrosulfite. Based on the amount of monomers used in the polymerization, for example from $1 \times 10^{-5}$ to 1 mol % is used of the reducing component of the redox catalyst.

It is particularly preferable to induce the polymerization through the action of high energy radiation, in which case it is customary to use photoinitiators as initiator b). Useful photoinitiators include for example α-splitters, H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds, such as the free-radical formers mentioned above, substituted hexaarylbisimidazoles or acylphosphine oxides, especially 2-hydroxy-2-methyl-propiophenone (Darocure® 1173). Examples of azides are 2-(N,N-dimethylamino)ethyl 4-azidocinnamate, 2-(N,N-dimethylamino)ethyl 4-azidonaphthyl ketone, 2-(N,N-di-methylamino)ethyl 4-azidobenzoate, 5-azido-1-naphthyl 2'-(N, N-dimethylamino)ethyl sulfone, N-(4-sulfonylazidophenyl)maleimide, N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene)cyclohexanone and 2,6-bis(p-azidobenzylidene)-4-methyl-cyclohexanone.

Particularly preferred initiators b) are azo initiators, such as 2,2'-azobis[2-(2-imidazolin-2-yl)propane]dihydrochloride and 2,2'-azobis[2-(5-methyl-2-imidazolin-2-yl)propane]dihydrochloride, and photoinitiators, such as 2-hydroxy-2-methylpropiophenone and 1-[4-(2-hydroxyethoxy)phenyl]-2-hydroxy-2-methyl-1-propan-1-one, redox initiators, such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators, such as 1-[4-(2-hydroxyethoxy)-phenyl]-2-hydroxy-2-methyl-1-propan-1-one, and also mixtures thereof.

The monomer dispersion comprises water as component c).

The pH of the monomer dispersion is not decisive. But, to meet product requirements, the pH of the polymer of the present invention can be adjusted to the desired range via the pH of the monomer dispersion. Polymers for cosmetic applications, for example, should have a pH of around 7.

The polymerization of the monomers a) can be carried out in the presence of a crosslinker or of a combination of various crosslinkers. Crosslinkers are compounds having two or more polymerizable groups. Polymerization in the presence of at least one crosslinker is preferred.

The concentration of crosslinker in the monomer solution is typically in the range from 0.001% to 1% by weight and preferably in the range from 0.01% to 0.5% by weight.

Suitable crosslinkers are for example (meth)acrylic esters of polyhydric alcohols which may have been alkoxylated with up to 100 and usually up to 50 ethylene oxide and/or propylene oxide units. Suitable polyhydric alcohols are in particular $C_2$-$C_{10}$-alkane-polyols having 2 to 6 hydroxyl groups, such as ethylene glycol, glycerol, trimethylol-propane, pentaerythritol or sorbitol. Preferred crosslinkers are polyethylene glycol diacrylate and polyethylene glycol dimethacrylates, which are each derived from polyethylene glycols (which may be considered as ethoxylated ethylene glycol) having a molecular weight in the range from 200 to 2000. Further usable crosslinkers are methylenebisacrylamide, trimethylolpropane triacrylate, trimethylolpropane trimethacrylate, ethylene glycol diacrylate, propylene glycol diacrylate, butanediol diacrylate, hexanediol diacrylate, hexanediol dimethacrylate or diacrylates and dimethacrylates of block copolymers formed from ethylene oxide and propylene oxide.

Useful crosslinkers further include diallyl carbonate, allyl carbonates or allyl ethers of polyhydric alcohols which may have been alkoxylated with up to 100, and usually up to 50 ethylene oxide and/or propylene oxide units, and allyl esters of polybasic carboxylic acids.

Allyl carbonates of polyhydric alcohols conform to the general formula I

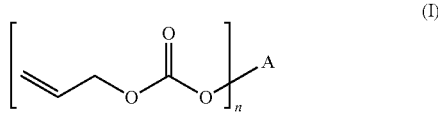

(I)

where A is the radical of a polyhydric alcohol which may have been alkoxylated with 0 to 100 and usually 0 to 50 ethylene oxide and/or propylene oxide units; and n represents the hydricness of the alcohol, for example an integer from 2 to 10 and preferably from 2 to 5. A particularly preferred example of such a compound is ethylene glycol di(allyl carbonate). Also suitable are particularly polyethylene glycol di(allyl carbonate)s which are derived from polyethylene glycols having a molecular weight in the range from 200 to 2000.

Preferred examples of allyl ethers are: polyethylene glycol diallyl ethers which are derived from polyethylene glycols having a molecular weight from 200 to 2000; pentaerythritol triallyl ether or trimethylolpropane diallyl ether. It is further possible to use reaction products of ethylene glycol diglycidyl ether or polyethylene glycol glycidyl ether with 2 mol of allyl alcohol and/or pentaerythritol triallyl ether.

A suitable allyl ester of a polyfunctional carboxylic acid is for example diallyl phtalate.

To disperse the aqueous monomeric phase in the hydrophobic liquid, emulsifiers known for this purpose can be used. They are for example sorbitan esters, such as sorbitan monostearate, sorbitan monooleate, sorbitan palmitate and sorbital laurate, and also glyceryl esters whose acid component is derived from $C_{14}$— to $C_{20}$-carboxylic acids.

The reaction is preferably carried out in apparatuses which are also suitable for spray drying. Such reactors are described for example in K. Masters, Spray Drying Handbook, 5th Edition, Longman, 1991, pages 23 to 66.

One or more spray nozzles can be used the in the process of the present invention. Usable spray nozzles are not subject to any restriction. The liquid to be spray dispensed may be fed to such nozzles under pressure. The atomizing of the liquid to be spray dispensed may in this case be effected by decompressing the liquid in the nozzle bore after the liquid has reached a certain minimum velocity. Also useful for the purposes of present invention are one-material nozzles, for example slot nozzles or swirl or whirl chambers (full cone nozzles, available for example from Düsen-Schlick GmbH, Germany, or from Spraying Systems Deutschland GmbH, Germany).

Preference for the purposes of the present invention is given to full cone nozzles. Of these, those having a spray cone opening angle in the range from 60 to 180° are preferred and those having an opening angle in the range from 90 to 120° are particularly preferred. For the purposes of the present invention, the average droplet diameter which results on spraying is typically less than 1000 μm, preferably less than 200 μm, more preferably less than 100 μm and customarily greater than 10 μm, preferably greater than 20 μm and more preferably greater than 50 μm, and can be determined by customary methods, such as light scattering, or by reference to the characteristic curves available from nozzle makers. The throughput per spray nozzle is advantageously in the range from 0.1 to 10 m³/h and frequently in the range from 0.5 to 5 m³/h.

The droplet diameter resulting in the course of spraying is advantageously in the range from 10 to 1000 μm and preferably in the range from 50 to 500 μm.

The reaction can also be carried out in apparatuses in which the monomer dispersion can free fall in the form of monodisperse droplets. Suitable for this purpose are apparatuses as described for example in U.S. Pat. No. 5,269,980 column 3 lines 25 to 32.

Dropletization through laminar jet disintegration as described in Rev. Sci. Instr., volume 38 (1966), pages 502 to 506 is likewise possible.

The use of spray nozzles for droplet generation is preferred.

In a preferred embodiment, the hydrophobic liquid d) is mixed with the other components only immediately, for example less than 60 seconds, preferably less than 30 seconds and more preferably less than 10 seconds, before spraying into the reactor. In this case, stabilization of the dispersion can be dispensed with, or at least the amount of emulsifier can be distinctly reduced.

Static mixers are preferred.

The reaction can be carried out in overpressure or in underpressure, an underpressure of up to 100 mbar below ambient being preferred.

The polymerization reactor preferably has a carrier gas flowing through it. Cocurrent operation is preferred; that is, the carrier gas flows downwardly through the polymerization reactor.

The polymerization rate and the drying rate typically have different temperature dependencies. This can mean, for example, that the sprayed droplets dry before the desired conversion has been achieved. It is therefore advantageous to control the reaction rate and the drying rate separately.

The drying rate can be controlled via the water vapor content of the carrier gas. The water vapor content of the carrier gas is generally up to 90% by volume and preferably up to 50% by volume.

The use of azo compounds or redox initiators as initiators b) is advantageous. The lighting off characteristics of the polymerization are better controllable with azo compounds via the choice of initiator, initiator concentration and reaction temperature than for example with pure peroxide initiators.

The carrier gas is advantageously preheated to the reaction temperature of 70 to 250° C., preferably 80 to 190° C. and more preferably 90 to 140° C. upstream of the reactor.

The reaction offgas, i.e., the carrier gas leaving the reaction space, can be cooled down in a heat exchanger for example. Water and unconverted monomer condense in the process. Thereafter, the reaction offgas can be at least partially reheated and returned into the reactor as recycle gas. Preferably, the recycle gas is cooled down such that the cooled recycle gas has the water vapor fraction desired for the reaction. A portion of the reaction offgas can be removed from the system and replaced by fresh carrier gas, in which case unconverted monomers present in the reaction offgas can be separated off and recycled.

Particular preference is given to an integrated energy system whereby a portion of the heat rejected in the cooling of the offgas is used to heat up the cycle gas.

The reaction space can be trace heated. Any trace heating is adjusted such that the wall temperature is not less than 5° C. above reactor internal temperature and condensation at reactor walls is reliably avoided.

The reaction product is obtained in the form of free-flowing polymeric particles and can be removed from the reaction space in a conventional manner, preferably at the base via a conveying screw, and if appropriate be further dried to the desired residual moisture content and to the desired residual monomer content.

Preferably not less than 95% by weight of the particulate polymer has a particle diameter in the range from 5 to 1000 μm and preferably in the range from 10 to 500 μm, especially larger particle diameters being agglomerates of distinctly smaller primary particles. The particle size distribution can be determined by customary methods, for example analogously to recommended test method No. 420.2-02 "Particle Size Distribution—Sieve Fraction" of EDANA (European Disposables and Nonwovens Association).

The present invention further provides apparatus for producing polymers by spray polymerization, comprising
i) a heatable reaction space,
ii) at least one apparatus for droplet generation in the upper region of the reaction space i),
iii) at least one carrier gas feed in the upper portion of the reaction space i),
iv) at least one carrier gas preheater,
v) at least one carrier gas outlet in the lower portion of the reaction space i),
vi) at least one means for recycling at least one portion of the removed carrier gas from the carrier gas outlet v) to the carrier gas feed iii),
vii) at least one conveying means in the lower region of the reaction space i) for product discharge,
viii) if appropriate at least one static mixer upstream of the apparatus for droplet generation ii), and
ix) if appropriate at least one source of radiation in the upper portion of the reaction space i), the upper region of the reaction space being the upper 30%, preferably the upper 20% and particularly the upper 10% of the reaction space volume and the lower region of the reaction space being the lower 30%, preferably the lower 20% and particularly the lower 10% of the reaction space volume.

Static mixers do not comprise any moving parts. Mixing, for example of two liquids, is effected by deflecting a flowing system. Static mixers can be for example woven fabric packs comprised in pipework segments. The necessary mixing energy is supplied by the pressure drop due to the woven fabric pack. Consequently, mixing performance is dependent on flow rate.

The process of the present invention advantageously combines the production of a polymer dispersion with the drying of this dispersion in one step in which the heat of polymerization can simultaneously be used for drying. Drying agglomerates the primary particles present in a droplet. The polymer powders of the present invention are readily redispersible and fast dissolving.

The polymers preparable by the process of the present invention are useful for thickening of fluids, especially aqueous systems, and also as absorbents in hygiene articles.

Uncrosslinked polymers dissolve in water, whereas the polymers prepared in the presence of crosslinkers swell substantially and likewise increase the viscosity of the aqueous medium substantially. For instance, 1% by weight aqueous solutions of the polymers have a pH 7 viscosity in the range from 6000 to 8000 mPas (measured in a Brookfield viscometer, spindle 6, at 20° C.).

The polymers of the present invention are useful as thickeners for aqueous systems, examples being paper coating slips, pigment print pastes and waterborne coatings such as architectural coatings. They are also useful in cosmetics, examples being hair cosmetics such as conditioners or hair setting compositions or as thickeners for cosmetic formulations and for surface treatment of leather.

The viscosity of 2% by weight aqueous solutions comprising polymers produced by the process of the present invention is not less than 1000 mPas, preferably not less than 2000 mPas and more preferably not less than 5000 mPas at 23° C.

EXAMPLES

Example 1

The aqueous phase consisting of 1.1 kg of vinypyrrolidone, 1.777 kg of 45% by weight of methyl chloride quaternized vinylimidazole, 100 g of vinylcaprolactam, 20 g of divinylethyleneurea, 2 g of sodium dihydrogenphosphate, 303 g of 0.1 M aqueous sodium hydroxide solution and 680 g of water was emulsified in the organic phase consisting of 8 kg of cyclohexane, 50 g of Hypermer® B246 (surfactant from ICI Surfantance, US) and 50 g of Span® 80 (surfactant from ICI Surfantance, US) by stirring at 23° C. for one hour. Nitrogen was then passed through the emulsion for 30 minutes. 10 kg/h of the emulsion were spray dispensed together with 100 g/h of a 10% by weight aqueous solution of 2,2'-azobis[2-(2-imidazolin-2-yl)propane]dihydrochloride (V44 azo initiator from Wako Deutschland, Germany) via a static mixer into a heated spray tower 8 m high and 2 m wide filled with nitrogen atmosphere (150° C., gas velocity 0.1 m/s in cocurrent). The monodisperse droplets were 400 μm in diameter. A dry white powder was obtained at the base of the spray tower. The average particle size was 90 µm. This powder formed a clear solution in water. A 1% by weight solution has a pH of 7 and a viscosity of 6000 mPas.

Example 2

The aqueous phase consisting of 1.5 kg of vinypyrrolidone, 3.33 kg of methyl chloride quaternized vinylimidazole, 6 g of divinylethyleneurea, 108 g of 10% by weight aqueous sodium hydroxide solution and 1.86 kg of water was emulsified in the organic phase consisting of 4.878 kg of cyclohexane, 300 g of 20% by weight Hypermer® B246 (surfactant from ICI Surfantance, US) and 120 g of Span® 80 (surfactant from ICI Surfantance, US) by stirring at 23° C. for one hour. Nitrogen was then passed through the emulsion for 30 minutes. 10 kg/h of the emulsion were spray dispensed together with 100 g/h of a 10% by weight aqueous solution of 2,2'-azobis[2-(2-imidazolin-2-yl)propane]dihydrochloride (V44 azo initiator from Wako Deutschland, Germany) via a static mixer into a heated spray tower 8 m high and 2 m wide filled with nitrogen atmosphere (150° C., gas velocity 0.1 m/s in cocurrent). The monodisperse droplets were 400 µm in diameter. A dry white powder was obtained at the base of the spray tower. The average particle size was 120 µm. This powder formed a clear solution in water. A 1% by weight solution has a pH of 7 and a viscosity of 8000 mPas.

Example 3

The aqueous phase consisting of ammonium acrylate solution (prepared from 4 kg of acrylic acid, 5.46 kg of water and 3.8 kg of 25% by weight ammonia solution), 1 kg of 50% by weight aqueous acrylamide, 0.36 kg of 1% by weight methylenebisacrylamide and 0.1 kg of Rongalit C (hydroxymethylsulfinic acid from Brüggemann Deutschland, Germany) was emulsified in the organic phase consisting of 4 kg of Shellsol K (mineral oil from Shell Deutschland, Germany) and 0.4 kg of Span® 80 (surfactant from ICI Surfantance, US) by stirring at 23° C. for one hour. Nitrogen was then passed through the emulsion for 30 minutes. The emulsion was spray dispensed together with the initiator solution via a static mixer in a heated spray tower 8 m high and 2 m wide filled with nitrogen atmosphere (140° C., gas velocity 0.1 m/s in cocurrent). In total, 0.2 kg of 10% by weight aqueous sodium persulfate and 0.1 kg of 5% by weight aqueous 2,2'-azobis[2-(2-imidazolin-2-yl)propane]dihydrochloride (V44 azo initiator from Wako Deutschland, Germany) were used as initiator solution. A dry white powder was obtained at the base of the spray tower. The average particle size was 25 µm. This powder formed a clear solution in water. A 1% by weight solution has a pH of 7 and a viscosity of 8000 mPas.

Example 4

The aqueous phase consisting of sodium acrylate solution (prepared from 4.5 kg of acrylic acid, 6.45 kg of water and 5 kg of 50% by weight aqueous sodium hydroxide solution) and 0.1 kg of Rongalit C (hydroxymethylsulfinic acid from Brüggemann Deutschland, Germany) was emulsified in the organic phase consisting of 4 kg of Shellsol K (mineral oil from Shell Deutschland, Germany) and 0.5 kg of Emulan® GOE (emulsifier from BASF Aktiengesellschaft, Germany) by stirring at 23° C. for one hour. Nitrogen was then passed through the emulsion for 30 minutes. The emulsion was spray dispensed together with the initiator solution via a static mixer in a heated spray tower 8 m high and 2 m wide filled with nitrogen atmosphere (140° C., gas velocity 0.1 m/s in cocurrent). In total, 0.2 kg of 10% by weight aqueous sodium persulfate and 0.1 kg of 5% by weight aqueous 2,2'-azobis[2-(2-imidazolin-2-yl)propane]dihydrochloride (V44 azo initiator from Wako Deutschland, Germany) were used as initiator solution. A dry white powder was obtained at the base of the spray tower. The average particle size was 25 µm. This powder formed a clear solution in water. A 1% by weight solution has a pH of 7 and a viscosity of 7500 mPas.

Example 5

The aqueous phase consisting of ammonium acrylate solution (prepared from 4.3 kg of acrylic acid, 5.2 kg of water and 4.7 kg of 50% by weight sodium hydroxide solution), 0.36 kg of 1% by weight methylenebisacrylamide and 0.1 kg of formic acid was emulsified in the organic phase consisting of 4 kg of Isopar® G (mineral oil from Exxon Mobile Chemical Europe, Germany) and 0.4 kg of Isolan® PDI (emulsifier from Goldschmidt Deutschland, Germany) by stirring at 23° C. for one hour. Nitrogen was then passed through the emulsion for 30 minutes. The emulsion was spray dispensed together with the initiator solution via a static mixer in a heated spray tower 8 m high and 2 m wide filled with nitrogen atmosphere (140° C., gas velocity 0.1 m/s in cocurrent). In total, 0.1 kg of 10% by weight aqueous 2,2'-azobis(2-amidinopropane)dihydrochloride (V50 azo initiator from Wako Deutschland, Germany) were used as initiator solution. A dry white powder was obtained at the base of the spray tower. The average particle size was 25 µm. This powder formed a clear solution in water. A 1% by weight solution has a pH of 7 and a viscosity of 6000 mPas.

Example 6

The aqueous phase consisting of ammonium acrylate solution (prepared from 4.3 kg of acrylic acid, 10.2 kg of water and 0.3 kg of 50% by weight sodium hydroxide solution), 0.36 kg of 1% by weight methylenebisacrylamide and 0.1 kg of formic acid was emulsified in the organic phase consisting of 4 kg of Isopar® G (mineral oil from Exxon Mobile Chemical Europe, Germany) and 0.4 kg of Isolan® PDI (emulsifier from Goldschmidt Deutschland, Germany) by stirring at 23° C. for one hour. Nitrogen was then passed through the emulsion for 30 minutes. The emulsion was spray dispensed together with the initiator solution via a static mixer in a heated spray tower 8 m high and 2 m wide filled with nitrogen atmosphere (110° C., gas velocity 0.1 m/s in cocurrent). In total, 0.1 kg of 10% by weight aqueous 2,2'-azobis(2-amidinopropane)dihydrochloride (V50 azo initiator from Wako Deutschland, Germany) were used as initiator solution. A dry white powder was obtained at the base of the spray tower. The average particle size was 25 µm. This powder formed a clear solution in water. A 1% by weight solution has a pH of 7 and a viscosity of 6000 mPas.

We claim:
1. A process for producing a polymer by spray polymerization of a monomer composition comprising
   a) at least one water soluble ethylenically unsaturated monomer, the solubility of the monomer a) in water being not less than 1 g/100 g of water,
   b) at least one initiator,
   c) water, and
   d) at least one hydrophobic, inert liquid d), the solubility of the liquid d) in water being less than 5 g/100 g of water and the liquid d) comprising no polymerizable groups,
   wherein an aqueous phase is dispersed in the liquid d) and the reaction is carried out in a reactor at 70° C. to 250° C.

in the presence of a carrier gas which is preheated to the reaction temperature upstream of the reactor.

2. The process according to claim 1 wherein the hydrophobic liquid d) is mixed with the other components only immediately before spraying into the reactor.

3. The process according to claim 2 wherein a static mixer is used for mixing.

4. The process according to claim 1 wherein the at least one hydrophobic liquid is cyclohexane or a mineral oil.

5. The process according to claim 1 wherein the at least one initiator c) is at least one azo compound and/or a redox initiator.

6. The process according to claim 1 wherein the at least one monomer a) is acrylic acid, vinylpyrrolidone, quaternized vinylimidazole, acrylamide, quaternized dimethylaminoethyl acrylate, diallyldimethylammonium chloride, and mixtures thereof.

7. A process for producing a polymer by spray polymerization of a monomer composition comprising
   a) at least one water soluble ethylenically unsaturated monomer, the solubility of the monomer a) in water being not less than 1 g/100 g of water,
   b) at least one initiator, and
   c) water,
   wherein the reaction is carried out in a reactor at 70° C. to 250° C. in the presence of a carrier gas which is preheated to the reaction temperature upstream of the reactor,
   and the polymerization is carried out in an apparatus comprising at least one means for carrier gas recycling and at least one carrier gas preheater.

8. The method according to claim 7 wherein the apparatus comprises at least one static mixer.

9. The method according to claim 7 wherein the apparatus comprises at least one source of radiation in the upper portion of a reaction space, the upper portion of the reaction space being the upper 30% of the reaction space volume.

10. The method according to claim 7 wherein the apparatus comprises a heatable reaction space.

11. The method according to claim 7 wherein the apparatus further comprises a means for droplet generation in an upper region of a reaction space and wherein the means is capable of generating monodisperse droplets having a droplet size in a range from 50 to 500 μm.

* * * * *